(Model.)
G. F. KNIGHT.
SAW MILL DOG.
No. 272,838. Patented Feb. 20, 1883.
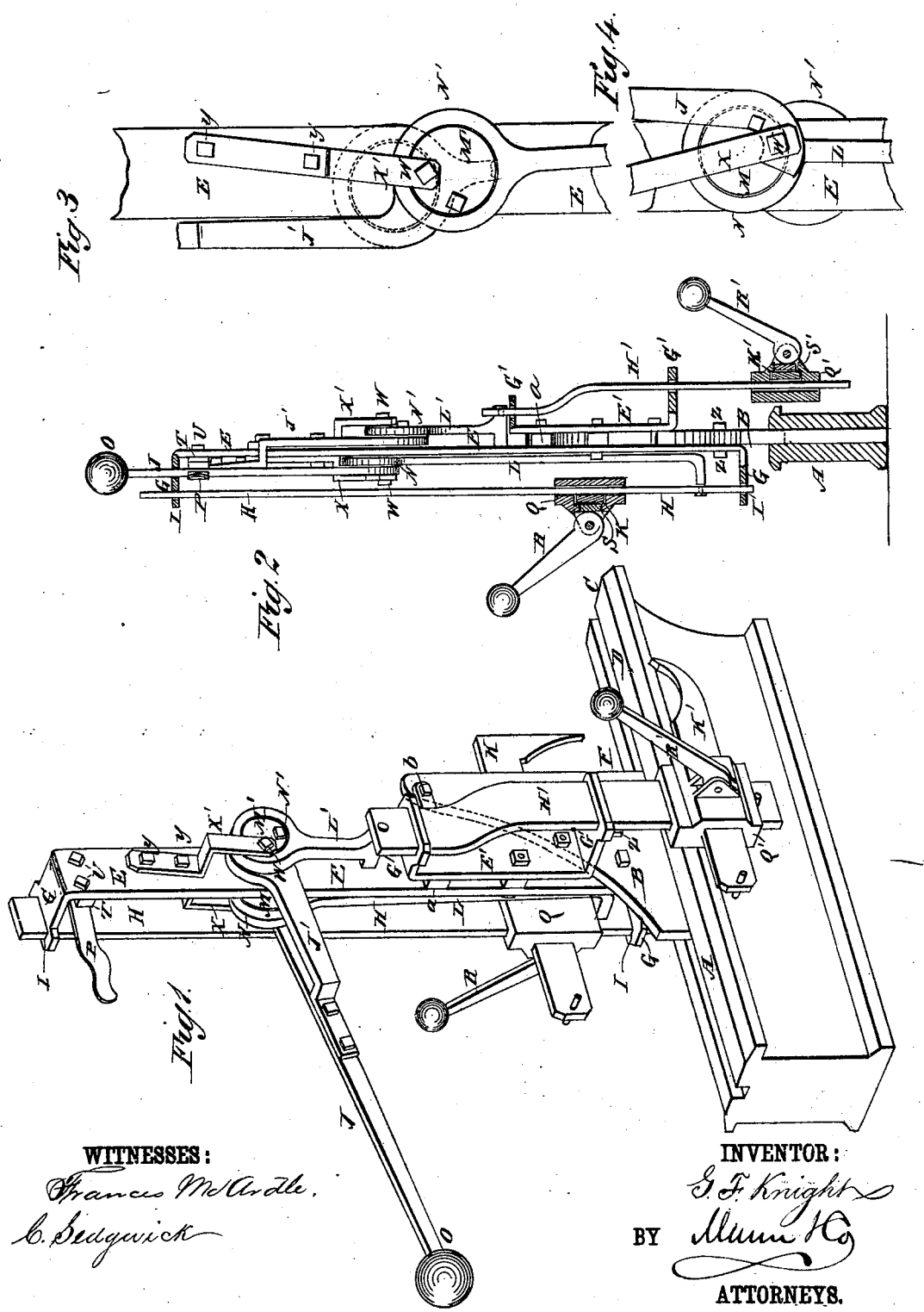

UNITED STATES PATENT OFFICE.

GEORGE F. KNIGHT, OF HICKSVILLE, OHIO.

SAW-MILL DOG.

SPECIFICATION forming part of Letters Patent No. 272,838, dated February 20, 1883.

Application filed April 25, 1882. (Model.)

*To all whom it may concern:*

Be it known that I, GEORGE F. KNIGHT, of Hicksville, in the county of Defiance and State of Ohio, have invented a new and Improved Saw-Mill Dog, of which the following is a full, clear, and exact description.

My invention relates to improvements in sawmill dogs, and is an improvement upon Letters Patent granted to me the 26th day of October, 1880, No. 233,627, as hereinafter described and claimed.

Reference is to be had to the accompanying drawings, forming part of this specification, in which similar letters of reference indicate corresponding parts in all the figures.

Figure 1 is a perspective view of my improved dogging apparatus. Fig. 2 is a rear elevation, with some parts in section. Fig. 3 is a side elevation of some of the parts, and Fig. 4 is a side elevation in reverse of Fig. 3.

A represents the head-block, whereon the knee B, which carries the dogging apparatus, slides toward and from the end C, to shift the log that lies on the block at D up to the saw, which works past the said end C of the headblock.

The apparatus for shifting the knee B is not here represented, that being no part of the invention now to be described.

E represents an upright bar, bolted to one side of the knee B a little back of its front edge, F, against which the log rests, said bar having both of its ends turned over horizontally and outwardly from said knee B, to form arms G to carry the sliding bar H in slots I, cut through the said horizontal arms G, the said bar H being worked by a lever, J, to operate the dog K, attached to said sliding bar, for engaging said dog with and disengaging it from the log, the dog being thrust down into the log by a downward movement of the lever and raised out of it by the reverse movement of said lever. The bar E, horizontal arms G, sliding bar H, dog K, and the lever J, for working the dog, also the knee B, are all represented in my former patent above referred to, and it is only certain improvements in the construction and arrangement of the same that are now to be described and hereinafter claimed.

I now propose to connect the lever J with the rod L, that transmits the motion of said lever to the sliding bar H by an eccentric, M, attached to the end of said lever, and strap N, attached to the rod, instead of the elbow or crank in the lever and pivot heretofore employed, and, to hold the dog fast in the log, I will now employ the weight O upon the end of the lever, which weight, acting through the eccentric M, rod L, and bar H, will effectually hold the dog to its bite in the log, and is simpler in construction and operation than any arrangement having a fastening device. To hold the lever up when the dog is detached from the log, I now propose to employ the spring-catch P, attached to the upper end of the bar E, suitably for catching and holding said lever when swung up to it for detaching the dog K. The dog K is carried by the shifting-block Q of a clamp, of which the weighted eccentric-lever R forms the binding device, the said dog being vertically adjustable the shifting of the clamp up and down on bar H, and also horizontally adjustable by itself sliding forward and backward in said clamp. I now propose to employ a gib, S, in this clamp, between the eccentric hub of the binding-lever and the dog, said gib being to extend along the shank of the dog a suitable distance to distribute the pressure thereon to prevent the dog from being bruised by the clamp, also to afford better hold of the clamp upon the dog.

The spring-catch P is attached to bar E by its shank T, doubled back on itself in U shape, and secured by two screws, U, so that said catch can be taken off and put on with the catch projecting in the reverse of the present position. The eccentric M is attached by a pivot, W, passing through a hole in the upright bar E transversely, and also supported in the bracket X, which is attached to upright E by bolts Y, so that said eccentric and bracket can be taken off and transferred to the opposite side of the bar E, and said bar E is bolted to knee B at Z, and to stud-bracket a, attached to knee B, at b, so that said bar E may be detached from the side of knee B, as herein shown, and attached to the opposite side; also, the bracket X, spring-catch P, lever J, and dog K may all be reversed, so as to work the dog either on the right-hand or left-hand side of the knee B. But I also propose to make a duplex apparatus, with a dog on each side of knee B, and said dogs working reversely to each other, and for this purpose I mount another eccentric, M', upon the pivot W, extended through bar E to a bracket, X', opposite to eccentric M, and set it with respect to M so that the two eccentrics move in reverse directions at the same time. The lever J is also provided with a branch, J', connecting with eccentric M'. An upright bar, E', is attached to the knee B, and has bent ends to carry a sliding bar, H', connected to eccentric M' by rod L' and yoke N', and on which a dog, K', is secured by clamp Q', weighted eccentric binding-lever R', and gib S', this dog having its point turned upward to be forced into the log from below, and the other having its point downward to be forced into the log from above. This dog K' is alike adjustable up and down and toward and from the log, as the other, and by the same arrangement of means.

I am aware that pivoted dogs mounted in a vertically-adjustable head connected to an eccentric-lever is old; and I am also aware that a dog provided with inclined slots in which pins work, and connected at each end to a T-shaped head lever, has heretofore been employed, and I therefore lay no claim to such inventions.

Having thus fully described my invention, what I claim as new, and desire to secure by Letters Patent, is—

1. The combination, with the bar E, provided with bent ends G, having slots I, of the sliding bar H, passing through said slots, the dog K, adjustably secured to said sliding bar, the lever J, the eccentric M, and the rod L, whereby the adjustable dog is moved bodily with the sliding bar, substantially as and for the purpose set forth.

2. The combination, in a dogging apparatus, substantially as herein shown and described, of duplex reversely-acting dogs K K', sliding bars H H', and reversely-operating eccentrics M M', the said dogs being adjustably clamped to the said sliding bars, and the eccentrics being operated by one and the same lever, J, substantially as described.

GEORGE FIRESTONE KNIGHT.

Witnesses:
 JAMES E. COULTER,
 M. B. EVERITT.